C. P. BAILEY.
Car Seat.
No. 18,375.
Patented Oct. 13, 1857.
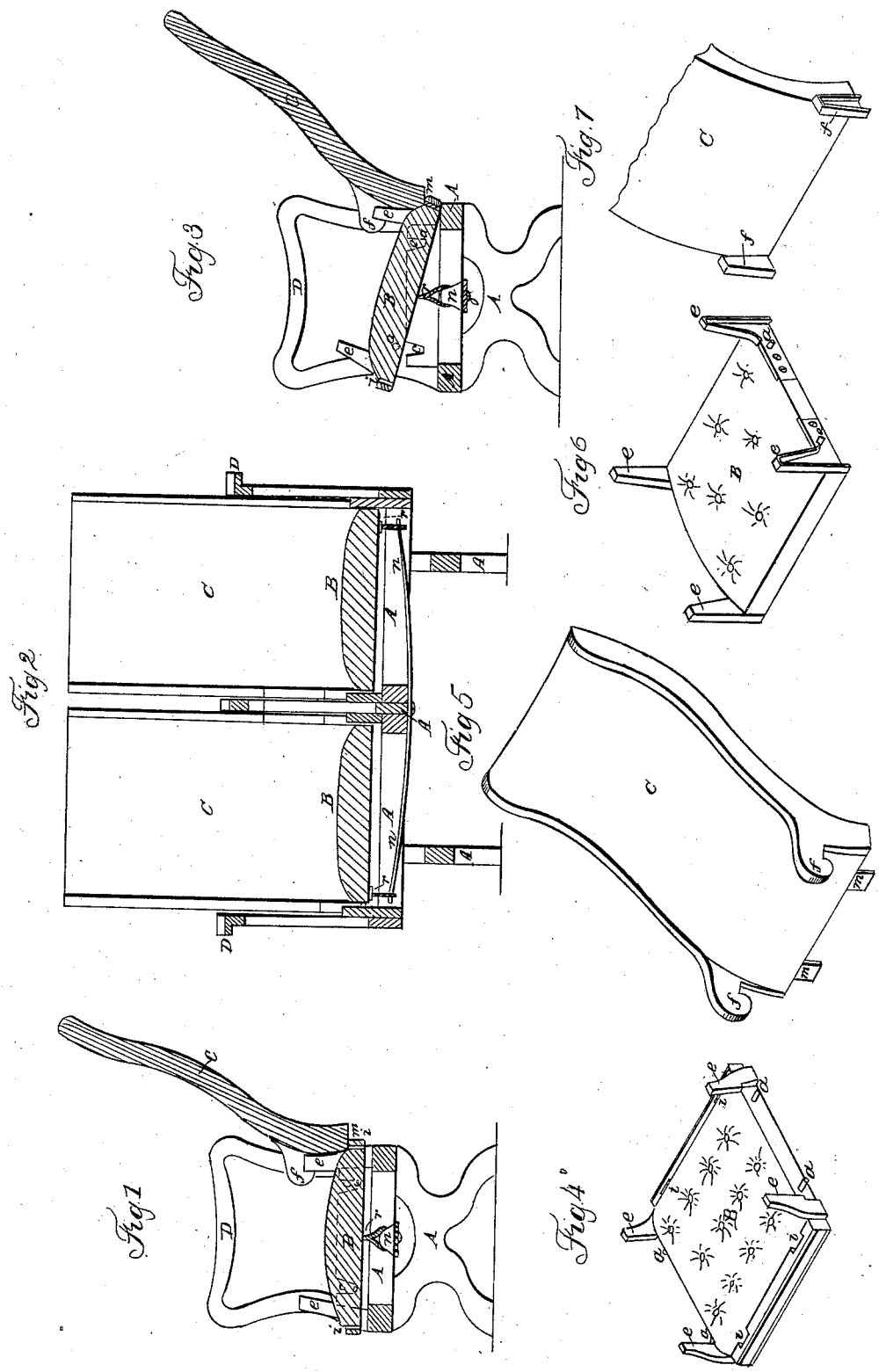

UNITED STATES PATENT OFFICE.

CHAS. P. BAILEY, OF ZANESVILLE, OHIO.

RAILROAD-CAR SEATS.

Specification of Letters Patent No. 18,375, dated October 13, 1857.

*To all whom it may concern:*

Be it known that I, CHARLES P. BAILEY, of Zanesville, in the county of Muskingum and State of Ohio, have invented certain new and useful Improvements in Reversible Backs for Car-Seats; and I do hereby declare the following to be a full, clear, and exact description of the same, reference being had to the accompanying drawings, making a part thereof, in which—

Figure 1 represents a transverse section through the seat. Fig. 2 represents a longitudinal section through the same. Fig. 3 represents a similar transverse section such as shown at Fig. 1, with the seat slightly elevated and the back dropped into a more inclined position. Figs. 4, 5, 6 and 7, represent detached portions of the seat, which will be specially referred to in the specification.

Similar letters of reference where they occur in the several figures denote like parts of the seat in all of them.

To enable those skilled in the art to make and use my invention, I will proceed to describe its nature and construction, with reference to the drawings.

Entire car seats have been made, so that they could be reversed upon their supports. Such seats are too heavy and unwieldly to handle and turn. I make no claim to any such seat. But the nature of my invention relates to the back of a car seat, which is separate from the seat and its support, and which back is reversible upon the seat, and although separate from each other, they have a motion together, when thrown into a more inclined position as will be explained.

A, represents the support of the car seat, which may be of any ordinary construction. Upon this support, or frame, are placed the seats B, B, said seats having pivoting pins *a*, *a*, in them, which pass into slots or gains *c*, *c*, cut or formed in the frame A, so that the seat, which is supported on said pins, may rock upon one seat or the other, as the occupier may for the time being be sitting. Upon each of the seats B, there are four cast iron lugs or projections *e*, *e*, *e*, *e;* and at their front and back two mortises or openings *i*, *i*. Over the lugs or projections *e*, *e*, two hooked arms *f f*, on the rails of the back C, catch, while the two tongues *m*, *m*, also on said back, enter the mortises or openings *i*, *i*, which firmly hold the back and seat together, but at the same time admit of the ready removal of the back when it is necessary to reverse it.

A spring *n*, is connected to the under part of the frame A, as seen at *o*, Fig. 2, and extends both ways, nearly the entire length of the seat; and to the ends respectively of this spring is connected by a cord, strap, or loop *r*, the two seats B, B, the object of the spring being to return the seat, and back, to the position shown in Fig. 1, when the occupant leaves it, in its most inclined position as seen in Fig. 3.

In Figs. 6 and 7 the lugs or projections *e*, *e*, *e*, *e*, are of wedge form, and cast in skeleton, for the sake of lightness and strength; and the hooks or catches *f*, are cast hollow or open, for a similar purpose, and to receive the wedge shaped projections in them. The connections thus being of metal, will not bind as wood would do by swelling. And in this construction, the tongues, cleats, and mortises, as shown in the other form may be dispensed with, and thus cheapen and simplify the seat. Or the wedges, and catches, may be reversed viz: the wedge put on the back, and the catch on the seat, and effect the same purpose. The seat and back, can be thrown into the position shown in Fig. 3, where it is caught and held by the rear part of the seat, coming against the frame A. In going back it strains up the spring *n*, and when the occupant of the seat leaves it, it will come back into the position shown in Fig. 1.

D, are the arm rests.

The upholstering of the seat and back, may be of any ordinary kind.

A principal feature in this car seat, in the way of economy, is in the fact that, such seats as are now used in cars, may at a very small expense be converted into such a reversible-back seat as I have herein described and represented, by merely adding the projections, catches and spring. The backs of car seats that in turning over, also turn upside down, or change the portion or side against which the back rests, cannot be of such a form as suits the shape of the body when sitting. They must be perfectly straight, and hence uncomfortable to the sitter. A reversible back like mine, has many advantages over the common ones in this respect, as mine may have the curves of the human body, and reversing the back does not change them in the least. I have therefore all the advantages of any car seat, without the disadvantages due to those which are hinged and turn over, or change their sides of support.

Having thus fully described the nature of my invention, I would state that, I am aware that, an entire car seat has been made, which was reversible on its supports; this I do not claim, but

What I do claim herein as new and desire to secure by Letters Patent is—

A detached reversible back to a car seat, when combined with a seat in such manner that said back and seat may have a falling or backward adjustment together, though separately connected to the frame, substantially in the manner, and for the purpose herein set forth.

CHAS. P. BAILEY.

Witnesses:
A. B. STOUGHTON,
E. COHEN.